CIRCUIT ARRANGEMENT FOR THE TRANSMISSION OF SIGNAL PULSES ACCORDING TO THE VOLTAGE-COMPARISON METHOD

Filed July 24, 1957

INVENTORS
A. HEZEL
W. WEISSER
BY
ATTORNEY

United States Patent Office 2,999,227

Patented Sept. 5, 1961

2,999,227

CIRCUIT ARRANGEMENT FOR THE TRANSMISSION OF SIGNAL PULSES ACCORDING TO THE VOLTAGE-COMPARISON METHOD

Alois Hezel, Stuttgart-Weilimdorf, and Wolfgang Weisser, Stuttgart, Germany, assignors to International Standard Electric Corporation, New York, N.Y., a corporation of Delaware Filed July 24, 1957, Ser. No. 673,970
Claims priority, application Germany July 26, 1956
10 Claims. (Cl. 340—172)

The invention relates to a circuit arrangement for the transmission of signal pulses between transmitters and receivers according to the voltage-comparison method, via one or more lines in telecommunication systems, particularly telephone systems.

In telephone switching systems some arrangements are known for the mutual comparison of two voltages, e.g. for ascertaining the equality of these voltages, or for the purpose of testing which one of these voltages is the higher one. By way of example, certain kinds of motion selectors, i.e. selector switches which are adapted successively to hunt or sweep the individual switching positions, under control of a register, are set by way of a voltage-comparison method.

However, it is also possible to carry out the voltage-comparison method for the setting of selectors or switches by way of a calling subscriber, whose station is equipped with keys instead of with the conventional number switch or subset dial. In this case the selecting or setting orders are not carried out by the dial pulses, but by the so-called key selection.

When assuming the employment of such a key selection, the setting of the desired switching stages can be carried out according to the voltage-comparison method, provided different sources of voltage are assigned to the individual keys in the key arrangement of the subscriber station, which, upon actuation of the keys, become effective via the subscriber line to the exchange.

An object of the instant invention is to provide a circuit arrangement for the transmission of signal pulses according to the voltage-comparison method, but which, however, is not exclusively restricted to the key-type selection, but may be employed for all kinds of transmission of signal pulses within the range of the telecommunication art.

The arrangement according to the invention is featured by the fact that there is only assigned one common source of voltage to the whole arrangement, and that the voltages which are to be compared between the one or more transmitters and the one or more receivers via the one or more lines connecting them or lying in between are produced by current from the common source of voltage at nonlinear resistances arranged in the respective transmitters and receivers.

The problem of the key selection, which in this connection is only supposed to be regarded as an exemplified form of the invention, has already brought about a number of solutions. Thus, for instance, one arrangement has become known in which an independent oscillator is assigned to the subscriber station and is tunable to 10 or 12 different frequencies. Thereby the current supply may be effected independently or via the subscriber's line from the exchange. At the exchange there are provided special receivers which are tuned to these frequencies.

Another conventional arrangement provides an oscillator at the exchange which is tuned by the subscriber to the required frequency and is evaluated at the exchange. Other types of conventional arrangements make use of a mechanical production or generation of the required frequencies by way of a key depression, and convert these oscillations into electric pulses or signals.

The aforementioned arrangements for the generation of switching signals by way of a key selection require a relatively high expenditure for apparatus at the subscriber station, whereas the arrangement of the invention not only reduces the costs and the space requirement, but also has the advantage of being very reliable in operation and is extensively independent of the line properties (length of line and insulating resistance).

The technical progress achievable by the aforementioned advantages of the arrangement of the invention will now be described in particular with reference to the following description of an embodiment of the invention, taken in conjunction with the accompanying drawings, in which.

Figure 2:
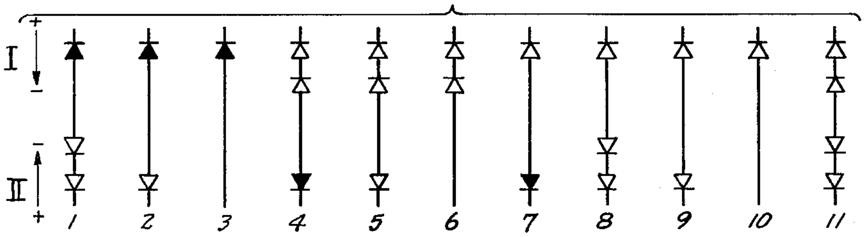
FIGURE 2 shows the switching combinations of the nonlinear resistances in the different subscriber sets.
Figure 2A:
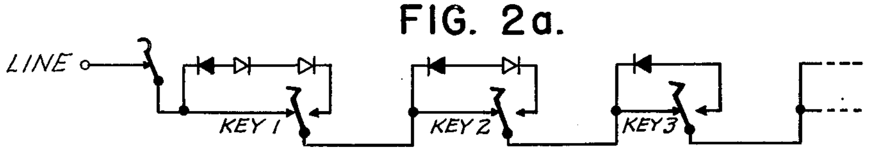
Figure 3:
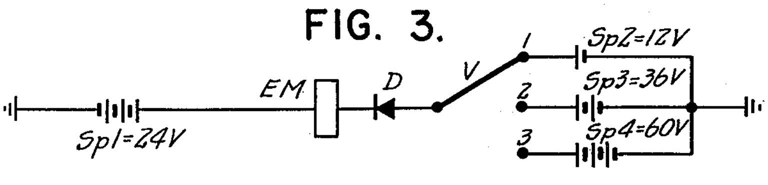
Figure 4:
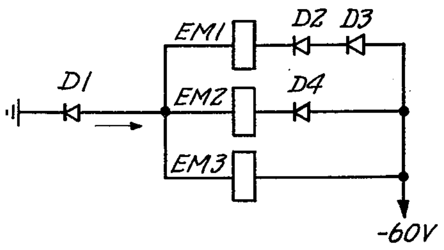

FIGURE 2*a* shows schematically the circuit obtained in the subscriber sets by depressing the keys;

FIGURE 3 shows a single circuit which illustrates the principle of the voltage-comparison method; and FIGURE 4 shows the arrangement of the invention according to the circuit as shown in FIGURE 3 of the drawings.

Figure 1:
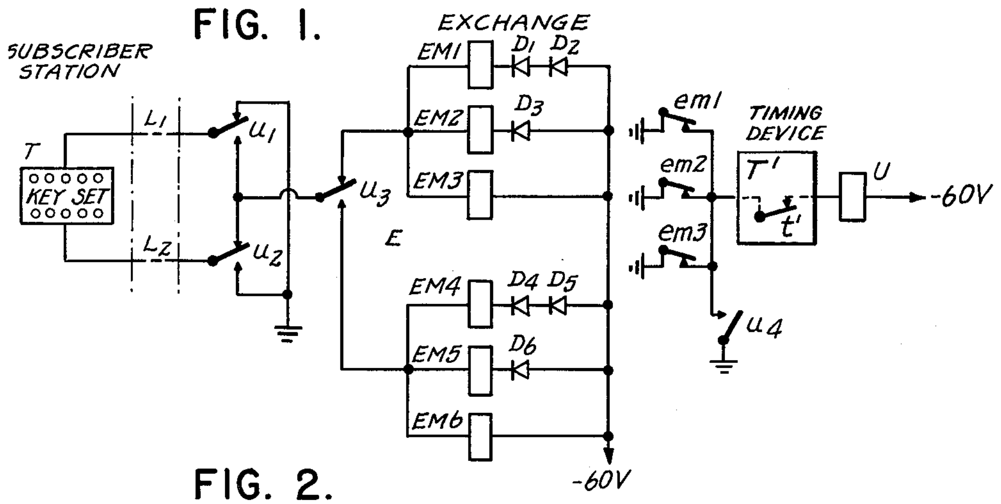
FIGURE 1 shows a schematic represetation of the entire arrangement, namely a substation with a key arrangement as transmitter and the corresponding receiving arrangements provided at the exchange.

Referring now to FIGURE 1, there is shown on the left-hand side of the drawing the subscriber set T with the key arrangement and which, via the lines L1 and L2, is connected with the receiving equipment E at the exchange. A battery of 60 volts is provided at the exchange as a source of voltage for this equipment and serves as the power supply unit for the receiving equipment itself, as well as for the transmitter stage, viz. for the subscriber set or station, via the lines L1 and L2.

The receiving equipment E comprises a number of receiving means EM1—EM6. These receiving means have been shown as relays and have one side connected to the negative terminal of the 60 volt battery, some of them through nonlinear resistances D1—D6, and the other side connected to ground via the two-way contacts *u*1, *u*2 and *u*3, and via the substation and the subscriber's line.

The nonlinear resistances D1—D6 at the receiving end may be silicon diodes, which have a special feature of becoming conductive in the backward direction (Zener effect) at a predetermined voltage. Germanium diodes may also be used. In the given example, the silicon diodes are so arranged that they have a voltage drop of 24 volts. Thus, a voltage of 60—(2×24) volts=12 volts is applied at the right side of the receiving means EM1. The second receiving means EM2 has only one diode D3 with a voltage drop of 24 volts between the receiving means and the battery, so that only a voltage of 36 volts is applied to the right side of this receiving means. The third receiving means EM3 has no diode at all connected to it, so that in this case the full voltage of —60 volts is applied to its right side. The remaining three receiving means, EM4—EM6, are connected in the same way as the receiving means EM1—EM3.

Each of the receiving means EM1—EM3 is provided with a switch device or contact, *em*1—*em*3, which is closed when the switching means is deenergized, and, when closed, connects ground to a relay U through a timing device T'. The other side of the relay U is connected to the negative terminal of the battery. The connection is such that the relay U is operated whenever any one or more of the receiving means EM1—EM3 restores to its normal, unoperated condition. The two-way contacts *u*1—*u*3 are operated by the relay U to effect a reversal of polarity of the lines L1 and L2 and a switching-over of the line from the receiving means EM1—EM3 to the receiving means EM4—EM6.

The timing device T′ may be any suitable conventional arrangement, consisting, for example, of thermocontacts or relays. The device is adjusted to initiate the timing function when the U relay is operated, as, for example, when the operating current passes through contact *t*′, if the latter is a thermocontact. In the arrangement shown, the timing is adjusted to open the contact *t*′ about 10 milliseconds after the initiation of the timing and hence at 10 milliseconds after the operation of the relay U the contact *t*′ will open and release the relay.

Also at the subscriber station a number of nonlinear resistances are assigned to the key arrangement T and are looped into the subscriber circuit in certain combinations corresponding to the depressed keys representing figures or digits. In FIGURE 2 of the drawings eleven switching combinations or eleven different ways of connecting the nonlinear resistances are shown. The nonlinear resistors shown in solid black are the usual diodes which are practically non-conductive in the backward direction and, therefore, have a voltage drop of more than 60 volts. The nonlinear resistors shown in single lines indicate the aforementioned silicon diodes (Zener diodes) with a voltage drop of 24 volts.

The diodes in the voltage-comparison arrangement represents so-called passive sources of voltage, whereby the line is fed from one side with a constant voltage, and the subscriber station causes combinations of diodes with a different voltage drop to be looped into the line circuit in accordance with the desired switching criterions. Although FIGURE 2 shows a plurality of separate individual circuits, it will be understood that only one ordinary diode and four of the Zener diodes are needed, the arrangement of key contacts connecting these diodes in the circuits shown when the keys are depressed.

For enabling a better understanding of the mode of operation of this voltage-comparison arrangement we shall now discuss the circuit, as shown in FIGURE 3. By way of example, this circuit may have a voltage S*p*1, shown as a battery, at the transmitting end and the receiving means EM at the receiving end, which leads to three different sources of comparison voltage S*p*2—S*p*4 via a nonlinear resistance D and the distributor V. The sources S*p*2—S*p*4 are also shown as batteries. The source S*p*2 has a voltage of 12 volts, the source S*p*3 a voltage of 36 volts, and the source S*p*4 a voltage of 60 volts.

To determine which voltage has been switched on at the transmitting end, the comparison voltages S*p*2—S*p*4 are successively applied via the distributor V. Because of the existence of the nonlinear resistance D, the receiving means EM is only capable of responding in the case of a voltage gradient from the receiving end to the transmitting end.

If, for example, the distributor V, is switched to the source of comparison voltage S*p*2, which has a value of 12 volts, then the receiving means EM will not respond. When the distributor is switched to the source S*p*3, which has a voltage of 36 volts, the receiving means EM may become effective, because a voltage gradient of 12 volts exists towards the transmitting end, i.e. because 36 volts minus 24 volts=12 volts. When the distributor is positioned on the third source of comparison voltage S*p*4, having a voltage of 60 volts, the receiving means will likewise respond since a voltage gradient of 60 volts minus 24 volts=36 volts exists toward the transmitting end. The criterion by which the receiving means EM becomes effective on the second and third position of the distributor can be used for determining the fact that a voltage of 24 volts is applied at the transmitting end.

As already mentioned in the foregoing, so-called passive sources of voltage, formed by the voltage drop of the nonlinear resistances may be provided, instead of the normal types of voltage sources which have been shown in FIGURE 3. To this end reference is made to the circuit of FIGURE 4, comprising such passive sources of voltage in the form of the diodes already mentioned. Let it be assumed that the diode D1 with a voltage drop of 24 volts is arranged at the transmitting end. At the receiving end, three receiving means EM1, EM2 and EM3 are arranged in a parallel-connection. The receiving means EM1 is connected through the diodes D2 and D3 to the voltage source of 60 volts; the receiving means EM2 is connected through the diode D4 to the voltage source 60 volts; and the receiving means EM3 is connected to the voltage source directly without the series connection of a diode. The above diodes D1—D4 are diodes of the silicon type having the Zener effect, already mentioned.

If it should become necessary to determine which voltage, that is, which diode D1, is switched on at the transmitting end, then this may be effected, with the aid of the voltage comparison method by the selective energization of the different receiving means EM. Since, as already mentioned, the silicon diodes have a voltage drop of 24 volts, a voltage of 12 volts is applied to the receiving means EM1 because of the existence of the diodes D2 and D3, a voltage of 36 volts is applied to the receiving means EM2 because of the existence of the diode D4, and a voltage of 60 volts is applied to the receiving means EM3 because of the lack of a series-connected diode. The voltage gradients between the receiving and transmitting end are exactly the same as in the example of FIGURE 3, so that only the receiving means EM2 and EM3 respond, because in these cases there is a voltage drop across the receiving means of respectively 12 and 36 volts.

Reference will now be made again to FIGURES 1, 2, and 2*a* for particularly examining the mode of operation of the voltage comparison arrangement for the key selection operation. Considering the fact that there are ten different dial numbers (selecting digits) and, in addition thereto, a ground-button signal, so that, altogether, at least 11 different signals have to be transmitted, it will be seen that it is necessary to form a corresponding number of switching combinations. In order to take into account the tolerances of the diode voltage and of the line resistance, the voltage stages between the transmitter and the receiver are appropriately arranged in a certain spaced relation. Thus, for instance, at the transmitting end, viz. at the subscriber station, voltages of 0 volts, 24 volts, 48 volts and greater than 60 volts are established. At the receiving end, i.e. at the exchange, the reference or comparison voltages are fixed at 12 volts, 36 volts and 60 volts. The existence of four possible voltages, at the transmitting end, as mentioned, provides four different switching combinations; that is, the transmission of four switching signals is possible. In addition, when a voltage polarity reversal is employed by the actuation of the contacts *u*1—*u*3, then transmission of a total of 4×4=16 criterions will be possible. Of these 16 possible switching criterions, however, only 11 are required, as already mentioned. Therefore it is appropriate to select only those 11 which cost the least. These 11 switching possibilities of the diodes in the subscriber station are shown in FIGURE 2 of the drawings. These individual switching combinations can be represented at the transmitting end by means of 4 Zener diodes and one normal type diode which may be arranged in different circuit combinations by a corresponding switching of the keys. Thus, for instance, the switching combination 1 in FIGURE 2 comprises one normal type diode, having a voltage drop of more than 60 volts in the voltage direction I, with ground connected at the top, and two Zener diodes each with a voltage drop of 24 volts, hence together 48 volts, in the voltage direction II with ground connected at the bottom. The remaining switching combinations 2–11 are connected with the diodes required in each case according to the voltages desired in both directions.

In addition to the combination of diodes set up by the keys, it should also be mentioned that the two-way contacts $u1$—$u3$ are brought into the operating condition or position by the switching means EM1—EM3 at the dialling of each number according to the voltage-comparison method and that the two-way contact $u1$—$u3$ have to be restored to normal again after the energization of the receiving means EM4—EM6.

Under normal conditions, EM1, EM2, and EM3 will be deenergized and relay U will be operating intermittently, since its circuit will be broken by timing contact $t'$. When the subscriber lifts his handset, if relay U is operated at that instant, EM4, EM5, and EM6 will operate, but no reading will be taken, and these devices will release when relay U releases. Then EM1, EM2, and EM3 will operate and break the energizing circuit for relay U. The circuit at the receiving end will remain in this condition until the subscriber operates a key to transmit a signal for the first digit of the called number. When a key is depressed, one of the diode combinations is connected across the subscriber's loop, causing the release of one or more of EM1, EM2, EM3. The combination of these receiving means operated at this instant may be used as part of the digit indication. The release of any one of EM1, EM2, and EM3 closes the circuit for U and this relay operates, and by its operation, over a contact not shown, may initiate the transfer to a suitable register of part of the digit information as determined by the combination of relays EM1 to EM3 operated. This transfer may be over make contacts of the operated relays EM1 to EM3 during the release time of these relays, since the operation of relay U releases these relays. At the same time the operation of relay U reverses reversing the polarity of the line and connecting the line to the receiving means EM4, EM5, and EM6. This will cause a combination of these devices under control of the reversed diode circuit to operate, and the relays EM4 to EM6 which operate will determine the remainder of the digit information which may then be transferred to the register over contacts of these relays. This takes place during the time that the contact $t'$ is closed. The opening of the contact $t'$ will cause relay U to release again.

As already mentioned in the introduction to the specification, the representation of the key selection according to the voltage-comparison method, as described hereinbefore is merely to be regarded as one embodiment of the invention, since there are various other possibilities for transmitting the necessary voltages to the receiving end with a still smaller or greater number of switching signals via either more or less lines and in other or different combinations.

What is claimed is:

1. A circuit arrangement for the transmission of signal pulses between transmitters and receivers according to the voltage comparison method via one or more lines in telecommunication systems, comprising a transmitter, a receiver, a line connected between said transmitter and said receiver, a single common source of potential, a plurality of nonlinear resistances, means including said line for connecting said transmitter and said receiver in series with said source of potential, potential responsive means in said receiver, means for setting the potential response of said potential responsive means by the insertion of combinations of said nonlinear resistances in series therewith with selected polarities, and means for adjusting the potential drop of said transmitter by selectively inserting combination of said nonlinear resistances in series therewith with selected polarities, whereby the voltages to be compared between said transmitter and said receiver via said line are produced by a current, originating with said common source of voltage and flowing through nonlinear resistances arranged at said transmitter and said receiver.

2. A circuit arrangement, as in claim 1, in which the nonlinear resistances are diodes.

3. A circuit arrangement, as in claim 2, in which the diodes are germanium diodes.

4. A circuit arrangement, as in claim 2, in which certain of the diodes are silicon diodes, whose characteristic feature consists in that they are current-conductive in the backward direction at a predetermined voltage.

5. A circuit arrangement, as in claim 1, in which the means for adjusting the potential drop of the transmitter comprises a plurality of keys, and means controlled by the depression of a key for inserting a predetermined combination of nonlinear resistances with a predetermined polarization in series with said transmitter.

6. A circuit arrangement, as in claim 5, further comprising means responsive to a signal from the transmitter for reversing the connection of the transmitter to the receiver in order to provide two directions of voltage for the purpose of transmitting the keyed signals.

7. A circuit arrangement, as in claim 6, in which the potential responsive means comprises a plurality of receiving means connected in parallel for evaluating the signals which are sent out by the transmitter under control of the keys.

8. A circuit arrangement, as in claim 7, in which the receiving means are divided into two groups, further comprising means at the receiver operated by the signal responsive means for switching the connection of the line from one group of receiving means to the other, whereby the one group becomes effective at the transmission of signals in the one direction, while the second group of said receiving means becomes effective at the transmission of the signals in the other direction.

9. A circuit arrangement, as in claim 5, in which the nonlinear resistances inserted in series with the transmitter are partly normal diodes and partly silicon diodes which act as passive sources of potential.

10. A circuit arrangement, as in claim 1, in which the nonlinear resistances at the transmitter and at the receiver provide a predetermined spaced voltage relation.

References Cited in the file of this patent

UNITED STATES PATENTS

| | | |
|---|---|---|
| 2,512,639 | Gohorel | June 27, 1950 |
| 2,810,072 | Amatniek | Oct. 15, 1957 |
| 2,813,262 | Garde | Nov. 12, 1957 |
| 2,829,282 | Hughes et al. | Apr. 1, 1958 |
| 2,854,651 | Kircher | Sept. 3, 1958 |